Patented Oct. 2, 1928.

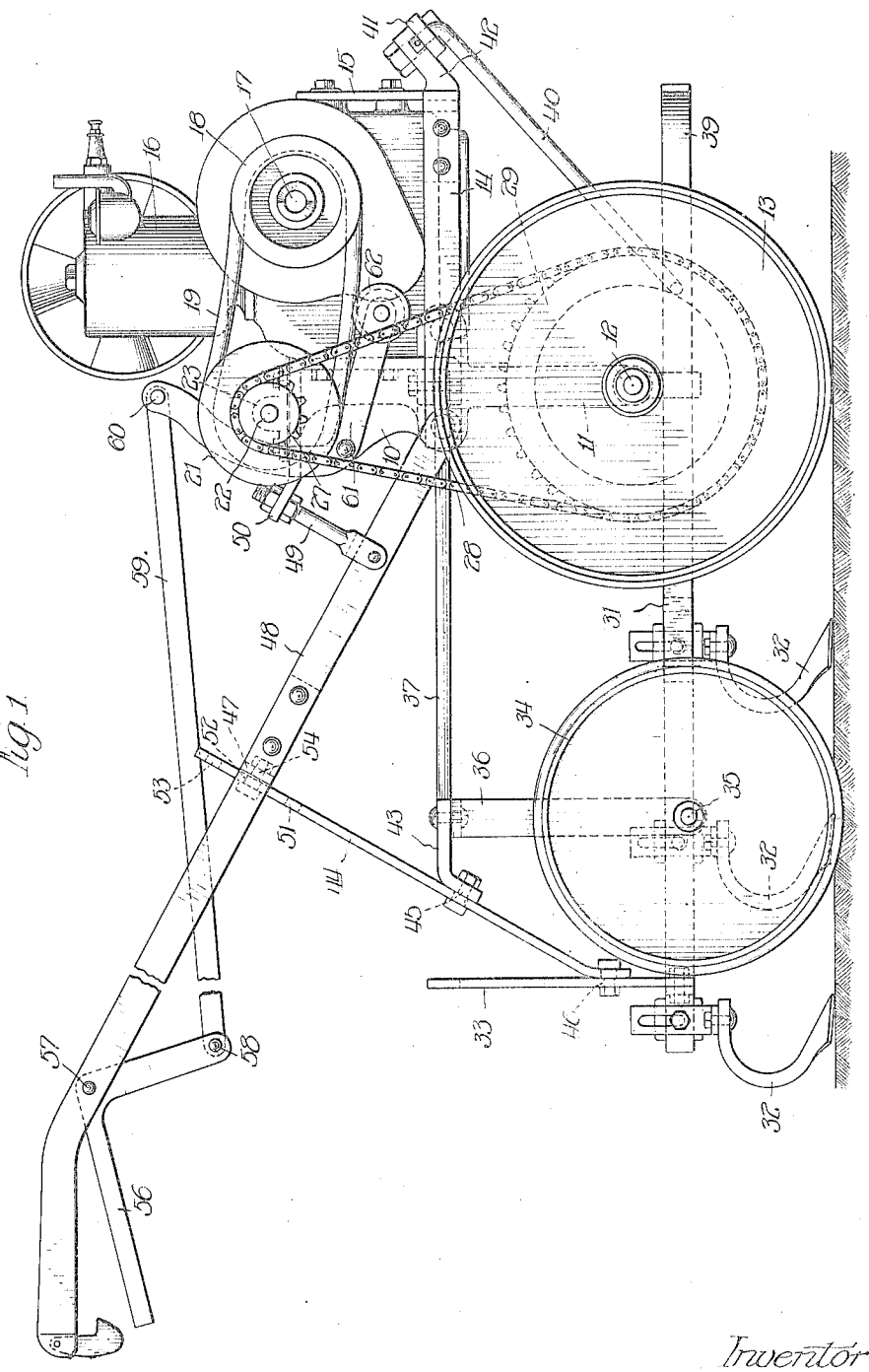

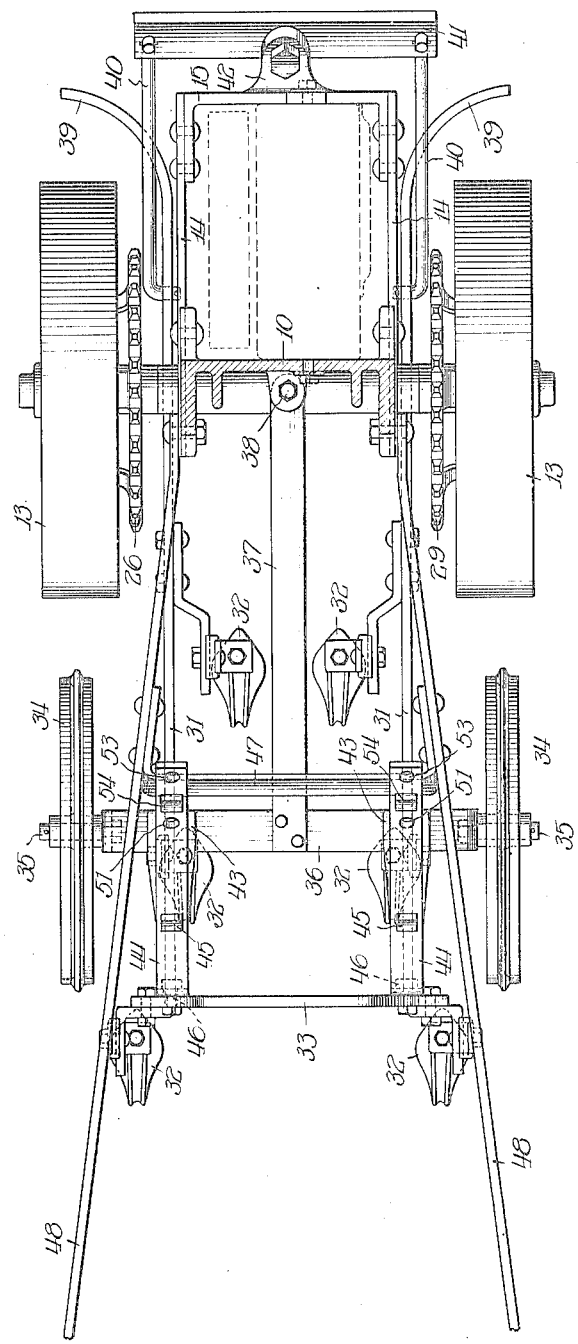

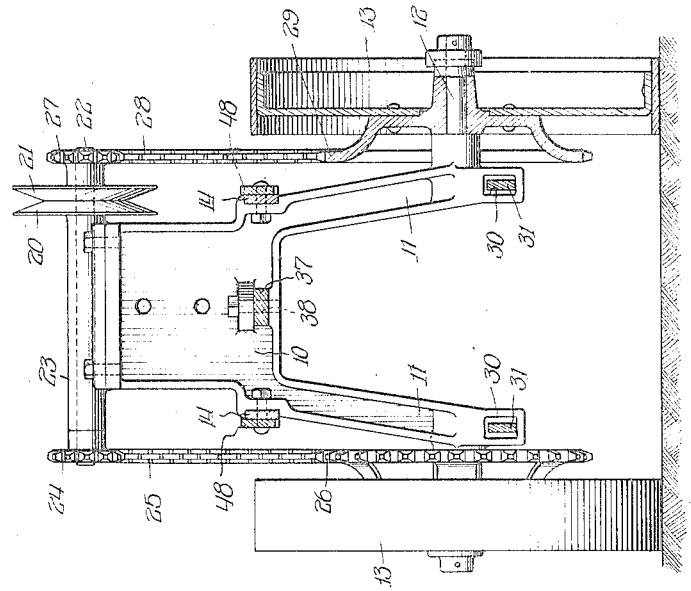
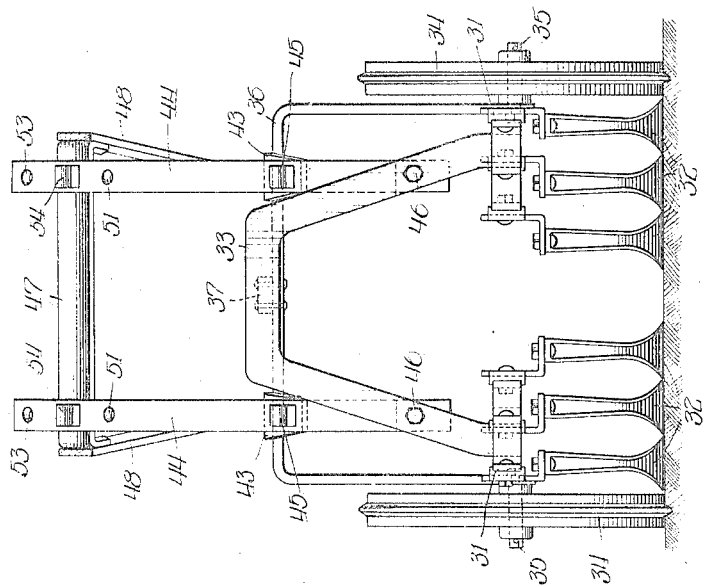

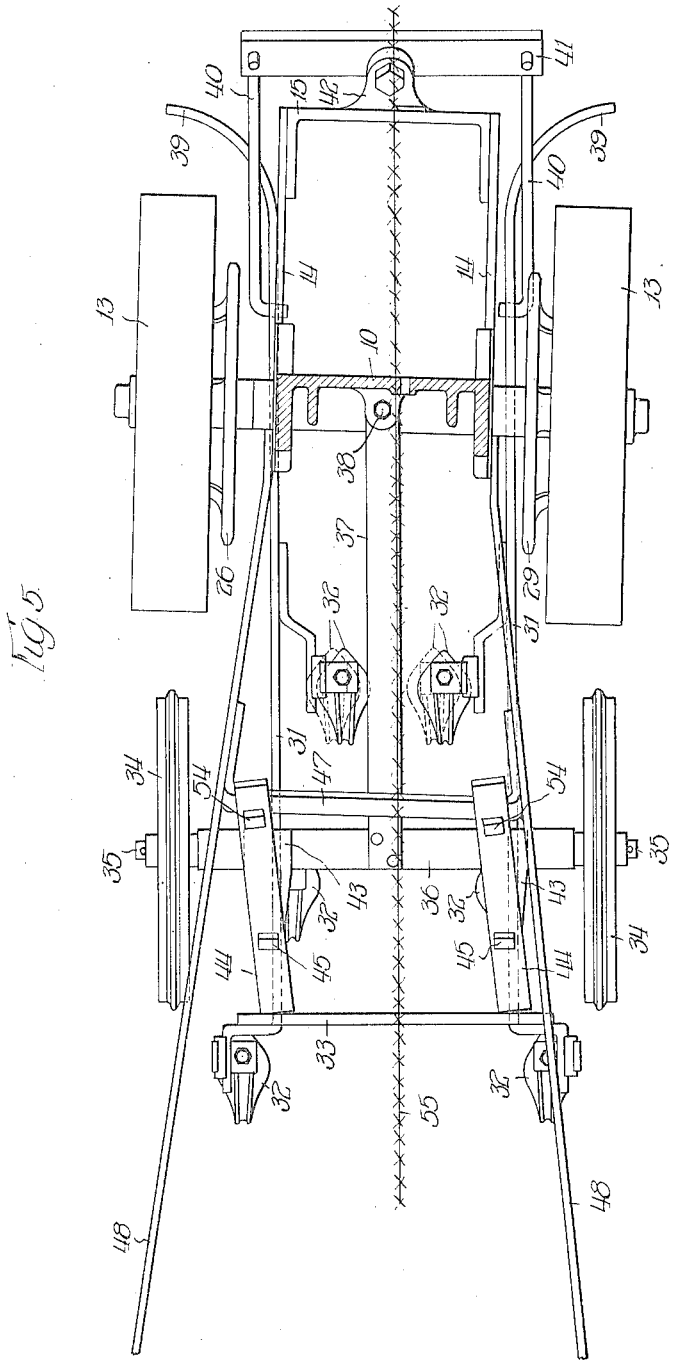

1,685,903

UNITED STATES PATENT OFFICE.

HARRY W. BOLENS, OF PORT WASHINGTON, WISCONSIN.

CULTIVATOR.

Application filed November 12, 1921. Serial No. 514,652.

This invention relates to cultivators and more particularly to garden cultivators.

In cultivators thus far produced, so far as I am aware, the steering and control of the cultivators and the tools is such that when the right hand tools approach too closely to the row of vegetation and it becomes necessary to turn the tractor to the right to ultimately shift the right hand tools a little further from the row of vegetation, such tools are first moved closer to the row of vegetation and in many instances thereby cause damage to the plants. The same conditions prevail when the left hand tools are too close to the row of vegetation and it is desired to move same to the left. The control of the cultivator as a whole and of the tools accordingly, is not entirely satisfactory, and leaves considerable to be desired.

Therefore, one object of my invention is to provide a cultivator in which the cultivator as a whole, and the tools may be accurately and easily controlled in a manner such that the device at all times may be centralized or maintained in central position with respect to a row of vegetation and easily and quickly shifted without the use of extra control parts and in a manner to meet all of the requirements for successful operation.

Another object is to provide a simple and improved garden cultivator in which the various parts thereof cooperate and function to render the operation and control of the cultivator simple and efficient.

These and other objects are accomplished by means of the cultivator disclosed on the accompanying sheets of drawings, in which—

Figure 1 is a side elevation of my improved power garden cultivator;

Figure 2 is a fragmentary top plan view of same, parts being broken away for the sake of clearness;

Figure 3 is a fragmentary rear elevation of the cultivator, the handle bars being shown in section;

Figure 4 is a detail view showing the main supporting arch of the cultivator with some parts shown in section; and Figure 5 is a top plan diagrammatic view showing the operation of the control mechanism.

The various novel features of the invention will be apparent from the following description and drawings, and will be particularly pointed out in the appended claims.

Referring to the figures of the drawings, it will be noted that the main frame of the cultivator includes an arch frame member 10 having depending legs 11 with laterally extending trunnions 12 upon which traction wheels 13 are rotatably mounted. Secured to the arch frame member 10 and extending forwardly therefrom are side frame members 14 which are connected at their front ends by a transverse casting 15, said frame members together acting as a support for an engine 16 which transmits propelling power to the traction wheels 13 through a shaft 17, a sheave 18 mounted thereon and around which a belt 19 passes, said belt also passing around a sheave including two separate relatively rotatable parts 20 and 21. The sheave part 20 is secured to a shaft 22 supported in a bearing 23 mounted in the upper portion of the arch frame member 10, said shaft having keyed to one end thereof a sprocket 24 which is operatively connected by a chain 25 to a sprocket wheel 26 connected to one of the traction wheels 13. The other sheave member 21 is loosely mounted upon the shaft 22 and preferably has integrally formed therewith a sprocket wheel 27 operatively connected by a chain 28 to another sprocket wheel 29 secured to the other traction wheel 13. By means of this transmission mechanism, propelling power is transmitted from the engine 16 to the traction wheels 13.

The lower ends of the legs 11 of the arch frame member 10 are provided with openings 30 through which tool-carrying bars 31 loosely extend. The rear ends of these tool-carrying bars are provided with any suitable cultivating tools 32, for cultivating the soil on either side of a row of vegetation. These tool-carrying bars 31 at their rear ends are maintained in proper spaced relation by means of an arch bar 33. Ground engaging gauge wheels 34 are rotatably mounted upon trunnions 35 formed at the lower ends of another arch member 36 which has rigidly secured to it, a draft bar 37 which is pivotally connected at 38 to the main frame 10. The front ends of the tool-carrying bars 31 are curved outwardly at 39 to gather in large plants in a manner to prevent damage to the leaves thereof. Just rearwardly of these outwardly curved portions, these tool-carrying bars are connected to links 40 which in turn are pivotally connected to an equalizer bar 41 pivotally connected to a forwardly extending projection 42 formed on the casting 15, whereby twisting movements on the right and left hand tool-carrying bars 31 and arch member 33 are prevented.

In connection with the control of the cultivator as a whole, and of the tools, the upper part of the arch 36 is provided with two rearwardly extending supporting arms 43, to each of which is pivotally connected intermediate its ends at 45 a control connecting link 44. The lower end of each of said links 44 is pivotally connected at 46 to an associated leg of the arch member 33 near the lower ends of the latter, while the upper end of each of said links 44 is pivotally connected to a cross bar 47 which connects the control handle bars 48. The front ends of these handle bars 48 are pivotally connected to the main frame member 10 and are adjustably supported by rods 49 extending through and secured to arms 50 forming a part of or secured to the main frame member 10. The intermediate control links 44 may be adjusted with respect to the control handle bars 48, for example, said links 44 are provided with a plurality of openings 51, 52 and 53 for the reception of a bolt 54 by means of which the position of the links 44 may be adjusted with respect to the control handle bars 48, and accordingly the depth of tools is thereby controlled. The intermediate links 44, in turn, act as supports for the rear portion of the control handle bars 48. By means of the control connection including the links 44 and arch member 33 between the tool-carrying bars 31 and handle bars 48, the cultivator as a whole and the tools are controlled in a simple, efficient and improved manner.

Referring particularly to Figure 5, let it be assumed that the right hand tools 32 have approached too closely to the row of vegetation 55. To centralize the cultivator as a whole, and also the tools 32 with respect to the row of vegetation, the tractor is steered to the right by moving the control handle bars 48 to the left, thereby causing the traction wheels 13 to move to the right. The upper ends of the intermediate control links 44 are moved to the left by and with the handle bars 48 and by virtue of the links 44 being pivotally connected intermediate their ends at 45 to the arms 43 which are secured to the relatively immovable arch 36 and connected to the ground engaging wheels 34, the lower ends of said intermediate control links 44 are shifted to the right, thereby immediately shifting the bars 31 with their tools 32 to the right. Accordingly, the central positioning of the tools with respect to the row of vegetation is immediately accomplished and accomplished directly without the right hand tools 32 first approaching more closely the row of vegetation, which heretofore has been the case to the great damage of plants. Likewise, if it is desired to move the left hand tools 32 further away from the row of vegetation such may be accomplished by moving the control handle bars 48 to the right, thereby turning the traction wheels 13 to the left and shifting the upper ends of the intermediate control links 44 to the right. The lower ends of the intermediate control links 44, accordingly, are shifted to the left, causing the bars 31 and their tools to move immediately to the left for centralizing said tool bars and their tools with respect to the row of vegetation.

By means of this control arrangement the cultivator as a whole and the cultivating tools are simply and easily controlled in a manner to meet all of the requirements for successful commercial operation. When the end of a row is reached and it is desired to turn the cultivator about, the same may be readily accomplished by lifting on the handle bars 48 which in turn will cause the tool bars 31 and wheels 34 to be raised from the ground, whereby the cultivator may be readily swung around.

The driving connection between the engine 16 and the traction wheels 13 may be simply controlled by means of a hand control member 56 in the form of a bell crank pivotally connected at 57 to one of the handle bars 48, one arm of the bell crank lever 56 being pivotally connected at 58 to a link 59 in turn connected at 60 to another bell crank lever 61 having pivotally connected at its free end a roller 62 for tightening or loosening the transmission belt 19 with respect to the sheave 18 and the sheave members 20 and 21.

It will be understood that when it is desired to steer or turn the tractor, such steering or turning movements will be greatly facilitated by slackening the belt 19 so that the sheave parts 20 and 21 may have a relative movement with respect to each other.

It is my intention to cover all modifications of the invention falling within the spirit and scope of the following claims.

I claim:

1. In a garden cultivator, the combination of a propelled frame, a tool carrying frame connected to the propelled frame, ground working tools carried by the tool frame, steering members connected to the propelled frame, and members connecting the steering members and tool frame, said members serving to move the tool frame laterally of the cultivator independently of the forward movement of the cultivator upon lateral steering movement of the steering members for steering the propelled frame.

2. In a garden cultivator, the combination of a propelled frame, a ground engaging frame pivotally connected to the rear of the propelled frame, a tool frame connected to the propelled frame, steering members for the propelled frame and connecting members between the steering members, ground engaging frame and tool frame, said members serving to move the tool frame laterally upon a lateral movement of the steering members.

3. In a garden cultivator, the combination of a propelled frame, a ground engaging frame drawn by the propelled frame, a tool frame, control members for steering the propelled frame, and connecting members pivoted at an intermediate point to the ground engaging frame, and connected at opposite sides of the pivotal point to the control members and tool frame, said connecting means thereby serving to move the tool frame in one direction when the control members are turned to guide the propelled frame in the same direction.

4. In a garden cultivator, the combination of a propelled frame, a ground engaging frame drawn by the propelled frame, a tool frame comprising members connected to the forward portion of the propelled frame, and a transverse member connecting said members in rear of the propelled frame, steering members for the propelled frame, and connecting members pivoted at an intermediate point to the ground engaging frame and connected at opposite sides of the pivotal point to the guiding members and tool frame, said connecting means thereby serving to move the tool frame in one direction when the steering means are turned to guide the propelled frame in the same direction.

5. In a garden cultivator, the combination of a propelled frame, a wheeled frame pivotally connected to the rear of the propelled frame, a tool frame pivotally connected to the front of the propelled frame and carrying tools in rear of the propelled frame, guiding members for steering the propelled frame, connecting members having intermediate pivoted connections to the wheeled frame and their ends pivotally connected to the guiding members and tool frame.

6. In a garden cultivator, the combination of a propelled frame, a wheeled frame pivotally connected to the rear of the propelled frame, a tool frame pivotally connected to the front of the propelled frame and carrying tools in rear of the propelled frame and between the wheels of the wheeled frame, guiding members for steering the propelled frame, connecting members having intermediate pivoted connections to the wheeled frame and their ends pivotally connected to the guiding members and rear portion of the tool frame.

7. In a garden cultivator, the combination of a propelled frame, traction wheels carrying the same, tool carrying bars, a secondary wheeled frame trailing said main frame, a non-rigid connection between said tool carrying bars and said main frame, guiding members connected to said main frame for guiding the same, and connecting members pivotally connected to said secondary frame, said guiding members and said tool-carrying bars whereby when the main frame is turned in one direction the tools carried by said bars are moved in the same direction.

8. In a garden cultivator, a propelled frame, an equalizer bar pivotally supported on the forward portion of the propelled frame, a tool frame comprising a pair of spaced longitudinally extending members pivotally connected at their forward ends to opposite sides of the equalizer bar, and a wheeled frame directly connected to the propelled frame and supporting the tool frame.

9. In a garden cultivator, a propelled frame, an equalizer bar pivotally supported on the forward portion of the propelled frame, a tool frame comprising a pair of spaced longitudinally extending members pivotally connected at their forward ends to opposite sides of the equalizer bar, an arched cross frame member connecting the rear of the longitudinal members, and a wheeled frame directly connected to the propelled frame and supporting the tool frame.

10. In a garden cultivator, a propelled frame, an equalizer bar pivotally supported on the forward portion of the propelled frame, a tool frame comprising a pair of spaced longitudinally extending members, links pivotally connecting the forward ends of the longitudinally extending members to opposite sides of the equalizer bar, and a wheeled frame directly connected to the propelled frame and supporting the tool frame.

Signed at Chicago, Illinois, this 2nd day of November, 1921.

HARRY W. BOLENS.